United States Patent [19]

Motov et al.

[11] 3,938,951

[45] Feb. 17, 1976

[54] METHOD OF OBTAINING TITANIUM TANNING AGENT AND ITS APPLICATION FOR TANNING HIDES, PELTS AND FUR SKINS

[76] Inventors: David Lazarevich Motov, ulitsa Fersmana, 18, kv. 19; Vladimir Ivanovich Konstantinov, ulitsa Fersmana, 18, kv. 44; Vladimir Georgievich Rumyantsev, Zapadnaya ulitsa, 3, kv. 56; Valentin Ivanovich Belokoskov, ulitsa Fersmana, 16, kv. 19; Eduard Osvaldovich Ude, ulitsa Fersmana, 22, kv. 12; Artur Grigorievich Babkin, ulitsa Fersmana, 18, kv. 34, all of Apatity, Murmanskoi oblasti; Alexandr Ivanovich Metelkin, Nagornaya ulitsa, 46/48, korpus 20, kv. 31, Moscow; Vasily Georgievich Suchkov, Leninsky prospekt, 87a, korpus 4, kv. 48, Moscow; Nina Ivanovna Koleshikova, Izmailove, Nikitinskaya ulitsa, 31, kv. 31, Moscow; Alexandr Vasilievich Motovilin, ulitsa Dzerzhinskogo, 185, kv. 55, Taganrog, Rostovskoi oblasti; Nina Trofimovna Rusakova, ulitsa Redneva, Ia, kv. 71, Vladivostok; Tatyana Vladimirovna Nikonova, bulvar Generala Karoysneva, 7, korpus 6, kv. 32, Moscow; Nina Ivanovna Polyaninova, ulitsa Dezerzhinskogo, 174"A", Tanganrog; Mikhail Grigorievich Sinenko, ulitsa Dezerzhinskogo, 183, kv. 21, Taganrog Rostovskoi oblasti; Irina Fedorovna Krylova, Komsomolsky prospekt, 19, kv. 36, Moscow; Vladimir Mikhailovich Yakutin, ulitsa Dzerzhinskogo, 185, Taganrog, Rostovskoi oblasti, all of U.S.S.R.

[22] Filed: Mar. 20, 1973

[21] Appl. No.: 343,120

Related U.S. Application Data

[60] Division of Ser. No. 343,120, Dec. 11, 1972, Pat. No. 3,852,431, which is a continuation of Ser. No. 20,133, March 16, 1970, abandoned.

[52] U.S. Cl. ............................................. 8/94.25
[51] Int. Cl.$^2$ ......................................... C14C 3/04
[58] Field of Search ................... 423/544, 545, 549; 8/94.25

[56]  References Cited
UNITED STATES PATENTS

| | | | |
|---|---|---|---|
| 1,934,778 | 11/1933 | Teichmann | 8/94.25 |
| 1,941,285 | 12/1933 | Teichmann | 8/94.25 |
| 2,068,877 | 1/1937 | Spence | 8/94.25 |

FOREIGN PATENTS OR APPLICATIONS

| | | | |
|---|---|---|---|
| 327,945 | 4/1902 | France | 8/94.25 |
| 263,886 | 1/1927 | United Kingdom | 423/544 |
| 290,174 | 8/1929 | United Kingdom | 423/544 |

OTHER PUBLICATIONS

Mellor, *A Comprehensive Treatise On Inorganic & Theoretical Chemistry*, Vol. 7(1927), p. 95.

Takakura, "Ammonium Titanyl Sulfate, Composition and Properties," Chemical Abstracts, Vol. 57, 4272 (1962).

*Primary Examiner*—Ralph S. Kendall
*Assistant Examiner*—Dennis L. Albrecht
*Attorney, Agent, or Firm*—Haseltine, Lake & Waters

[57]  ABSTRACT

A method of obtaining a titanium tanning agent, based essentially upon sulfuric-acid treatment of titaniferous material followed by precipitating from titanium sulfate solution ammonium titanyl double sulfate monohydrate with subsequent treatment of that salt with ammonium sulfate solution to obtain the compound of titanium sulfate as a tanning agent. Methods of tanning using conventional techniques require up to 10 per cent of the titanium tanning agent by weight of the pelt calculated as $TiO_2$.

7 Claims, No Drawings

METHOD OF OBTAINING TITANIUM TANNING AGENT AND ITS APPLICATION FOR TANNING HIDES, PELTS AND FUR SKINS

This application is a divisional of Ser. No. 343,120 filed Dec. 11, 1972, now U.S. Pat. No. 3,852,431, which is a continuation of Ser. No. 20,133, filed Mar. 16, 1970, now abandoned.

This invention relates generally to methods of obtaining mineral tanning agents and more specifically to methods of obtaining titanium-based tanning agents and their application in the tanning of hides, pelts and fur skins.

A widespread application of various mineral tanning agents such as chromium, zirconium and aluminum compounds, is known in the present-day leather industry along with the use of vegetable tannins. Titanium compounds are likewise known to possess tanning properties (astringency). Among such compounds there may be cited the following: sulfates, such as, titanyl sulfate; chlorides, oxalates, gluconates, tartrates, lactates.

A method of obtaining titanyl sulfate as adopted in the trade is known to consist in subjecting titaniferous material to treatment with sulfuric acid, thus causing titanium to pass into sulfuric acid solution, wherefrom an astringent, viz., titanyl sulfate is subsequently isolated, e.g., by neutralizing the solution with lime, filtering out the resultant calcium sulfate and evaporating the filtrate thus obtained. The above-described technique, however, is too complicated, the finished product is difficult to obtain in a form convenient enough to be employed as a tanning agent and, moreover, the agent itself does not possess high astringency (cf., e.g., German Pat. No. 517446, 1938).

Other of the above-listed titanium compounds are scarcely available, since lactic, tartaric and other acids mentioned above are both expensive and critical materials.

Titanium compounds are not made use of in the modern leather industry for tanning hides and pelts on account of the fact that said compounds do not possess the whole complex of the required properties and characteristics, namely, convenience in handling, good solubility, adequate stability in storage and satisfactory tanning properties (astringency), whereas the methods of obtaining said compounds are intricate and in some cases uneconomical.

The invention is concerned with an improvement in the method of obtaining a titanium tanning agent and especially the operations of isolating a titanium tanning compound from the solution of titanium sulfate so that said tanning compound should be convenient in handling, stable in storage, possess good solubility and make it possible, when used as a tanning agent, to obtain a wide assortment of new kinds of leather of improved properties.

Said object is accomplished in a method of obtaining a titanium-based tanning agent, by treating titaniferous material with sulphuric acid, passing titanium into sulfuric acid solution and isolating titanium sulfate as a tanning agent, by adding ammonium sulfate to a solution of titanium in sulfuric acid to precipitate ammonium titanyl double sulfate monohydrate $[(NH_4)_2TiO(SO_4)_2 \cdot H_2O]$, whereupon said salt is treated with a solution of ammonium sulfate, thus stabilizing the above monohydrate form and obtaining the titanium sulfate compound as a tanning agent. The agent thus obtained is stable when under storage, is readily soluble and convenient in handling.

According to the invention, in a method of tanning delimed pelts using tanning agent obtained by the afore-described technique, said the tanning agent is employed in a dry state without being preliminarily dissolved and is introduced into the tanning bath in two steps so that at the initial stage of the tanning process the above agent is introduced in an amount of from 2 to 5 per cent of the entire pelt weight (as referred to $TiO_2$) and at the final stage thereof, in a quantity of from 5 to 8 per cent upon draining the liquor from the tanning vat and penetrating of the pelt by the tanning agent.

When employed in tanning delimed and pickled or delimed, pickled and chrome-treated pelts, the tanning agent is used in an amount of from 5 to 10 per cent of the total pelt weight as referred to $TiO_2$.

The present titanium tanning agent is applicable to tanning pelts in combination with a zirconium tanning agent.

Application of the titanium tanning agent in the above-stated amount to tanning hide stock makes it possible to obtain a wide range of new kinds of leather possessing improved properties, as well as producing a synergistic effect with respect to acceleration of the tanning process and improvement of the quality of the finished leather.

When applying the tanning technique according to the invention use can be made of soda ash in addition to the tanning agent so as to make the latter basic, which fact simplifies the technological process and increases the rate of tanning and neutralization. When applying the titanium tanning agent in combination with a zirconium tanning agent no soda ash should be added.

When using the herein-disclosed tanning agent in practising the pelt tanning technique proposed herein, use can be made of a mixture of sodium sulfite with urotropin (hexamethylenetetramine) as neutralizing substances, this considerably increasing the shrinkage point of leather (up to 118°C), adding to the tanning effect, accelerating the neutralization process and contributing to better quality of the finished leather.

The herein-proposed tanning agent is likewise applicable for tanning fur skins. In this case it is introduced just after soaking the skins in an amount of from 0.3 to 1 per cent of the total weight of soaked skins, this adding much to the strength of fur, which is of special importance for low-strength fur skins such as those of gopher or suslik and of water rat, and increasing hair thickness in fur skins featuring a thin hair covering such as low-grade rabbit skins, and the like.

When employing the present tanning agent in tanning delimed fur skins the latter are treated with dichromic acid and then the tanning agent is added in a quantity of from 2 to 4 weight per cent with subsequent reduction of chromium.

This makes it possible to obtain more compact leather and thicker fur when processing low-grade wooled sheepskin, and the like.

The method disclosed in the present invention provides a wide assortment of new kinds of leather possessing improved quality characteristics.

Employment of the present titanium tanning agent in combination with retanning by synthetic tannins (syntans) results in obtaining light-colored flexible leather possessing an attractive appearance and improved wear- and mold-proofness.

A peculiar feature of titanium-syntan dressed leather is a higher yield as to area thereof which is of importance from the economic viewpoint. Another salient factor resides in a reduced cost of chemicals as compared to that of chemicals used in chrome-vegetable and zirconium-syntan tanning processes.

The herein-proposed tanning method enables critically-short vegetable tannins to be dispensed with.

When tanning fur skins the strength of such skins that possess loose flesh (e.g., gopher, water rat) is sharply improved, whereas their hair covering becomes thicker.

The present invention is exemplified below in certain specific examples illustrating the method of obtaining the titanium tanning agent and specific and preferred techniques of tanning hide, pelt and fur skins applying the above agent.

The essence of the herein-disclosed method of obtaining a titanium tanning agent resides in the fact that ammonium sulfate is added to a sulfuric acid solution of titanium available from titaniferous material to precipitate ammonium titanyl double sulfate monohydrate $[(NH_4)_2TiO(SO_4)_2 \cdot H_2O]$, whereupon said salt is treated with ammonium sulfate solution, thus stabilizing the above monohydrate form and obtaining titanium sulfate compound as a tanning agent applicable as a tannin in tanning pelt and fur skins.

Specifically, the present method is carried into effect as follows.

Titaniferous concentrated material (47 per cent of $TiO_2$) taken in an amount of 1 ton, is treated with sulfuric acid and ammonium sulfate is added, consumption of $H_2SO_4$ amounting to 2 or 4 tons and ammonium sulfate, from 0.1 to 0.5 ton. Conditions of sulfuric-acid treatment (i.e., temperature, duration, acid concentration) depend upon the nature of the titanium-containing material. Then the cake obtained as a result of the above treatment is leached with water using recycled solutions, titanium is caused to pass into solution thus getting rid of insoluble admixtures remaining as a precipitate.

Next the precipitate is filtered out and washed with water which then is reused in lixiviation as a recycled solution.

Then, ammonium sulfate and sulfuric acid are added to the sulfuric acid solution of titanium until the content of free $H_2SO_4$ is from 300 to 450 g per lit and $(NH_4)_2SO_4$ from 180 to 300 g per lit, the aggregate concentration of ammonium sulfate and sulfuric acid in the solution amounting to 520–620 per lit. Then ammonium titanyl double sulfate is precipitated from the obtained solution in a monohydrate form $[NH_4)_2TiO(SO_4)_2 \cdot H_2O]$. The duration of the precipitation procedure under intermittent process conditions is from 16 to 24 hours, while in a continuous process its duration may be substantially diminished.

Precipitation temperature of the salt ranges from 12° to 30°C. At higher temperatures an anhydrous form of the ammonium titanyl double sulfate is likely to precipitate from the above solution and this is unsuitable to be used as a titanium tanning agent. The titanium salt having been precipitated from the solution, 3 to 10 g per lit of $TiO_2$ are found to remain therein. The percentage of conversion of titanium from the original stock into the salt ranges from 55 to 90 depending upon the nature of the titanium-containing material.

Then the titanium salt is filtered out and washed with sulfuric-acid solution containing 300 to 450 g per lit of $H_2SO_4$ and 180 to 300 g per lit of $(NH_4)_2SO_4$ and taken in a quantity of from 0.4 to 0.7 cu.m per 1 ton of salt, the latter being at the same time purified from dissoluble admixtures contained in the initial titanium sulfuric-acid solution.

The filtered-out and washed salt is then treated with a solution containing ammonium sulfate in an amount of from 300 to 400 g per lit, consumption of said solution ranging from 0.4 to 0.7 cu.m per 1 ton of salt. Such a treatment is conducive to stabilization of the monohydrate form of the ammonium titanyl double sulfate.

Said treatment is effected by washing on a filter, or by repulpifying with subsequent filtration.

Thus, the obtained ammonium titanyl double sulfate in a stable monohydrate form is essentially a titanium tanning agent possessing a whole complex of the required properties and characteristics, that is, convenience in handling, high solubility, adequate stability when under storage and satisfactory tanning properties.

The yield of the tanning titanium salt from the original concentrated stock amounts to 1.3–2.1 t, its composition in weight per cent being as follows: $TiO_2$ — 19 to 22; $SO_3$ — 45 to 48; $(NH_4)_2O$ — 14.5 to 16.5; $F_2O_3$ — not in excess of 0.05; insoluble reside — not in excess of 0.3.

The salt is a white powder; under the microscope it appears as isotropic crystals-tetrahedrons.

The titanium tanning agent obtained by the aforedescribed method is applicable in tanning hides and pelts, the tanning technique being as follows.

Dehaired skin or pelt available from cattlehides (butts, offals) is subject to conventional treatment procedures, deliming inclusive, with the sole exception that the liming process should not be sharp and should be as short as four days.

Then the dehaired skin or pelt is charged into a revolving drum, the latter is filled with water at a temperature of from 20° to 25°C until a 1.5 water-to-pelt ratio is obtained and the titanium tanning agent is introduced in an amount of from 2 to 5 weight per cent of the pelt as referred to $TiO_2$. The above amount depends upon the thickness and stoutness of the pelt under treatment. Simultaneously with the tanning agent ammonium sulfate is added in an amount of from 4 to 8 per cent of the pelt weight.

All the components mentioned above are introduced in the dry state. Next the tanning process starts with the drum rotating, said process taking 4 to 10 hrs until a complete penetration of the pelt by the tanning agent. The degree of penetration is checked with hydrogen peroxide which reacts with the tanning agent to form a complex colored yellow-amber. The pelt having been completely penetrated by the tanning agent (which is indicative of the end of the initial stage of the tanning process), the liquor is drained off, whereupon a second stage of the tanning process is carried out which is similar to the previous one with the only exception that in addition to ammonium sulfate, soda ash preliminarily mixed with the tanning agent is introduced together therewith, the consumption of the tanning agent being from 5 to 8 per cent of the pelt weight and that of soda ash in such an amount as to heighten the basicity of the agent up to 60–70 per cent. The second stage of the tanning process takes from 12 to 36 hours.

The second stage over, the tanning liquor is drained off, the semifinished product is washed with water and neutralized by adding soda ash in a quantity of 2 weight per cent. In a 4 to 5-hr period of time a mixture of sodium sulfite with urotropin is added in an amount of from 1 to 2 per cent of the pelt weight.

When the pH value of hydrogen ion concentration in the semi-finished product has reached 4 to 4.5, neutralization is terminated. Next the semi-finished goods are washed up and retanned with the use of synthetic tannins taken in an amount of from 15 to 18 per cent as referred to the tanning agent.

Use is made as synthetic tannins of such syntans that are stable in acid medium and resistant to the effect of ammonium sulfate. Retanning proceeds at a water-to-pelt ratio of from 1.4 to 1.6, a temperature of from 40° to 45°C during 24 to 36 hours, the initial pH value being not lower than 4. To suppress froth-formation when retanning, there is added along with the tanning agent either a special antifroth dressing paste or sulfonated blubber in an amount of from 0.5 to 1 per cent. Then the semi-finished goods are washed, sammed, dip-filled and stuffed. When dip-filling, use is made of the following agents: magnesium or ammonium sulfate in an amount of from 5 to 10 per cent; treacle in an amount of from 5 to 10 per cent, synthetic tannin in the form of a concentrated solution in an amount of 1 per cent of the tanning agents and a phenol fixative of tanning matter in an amount of from 1 to 2 per cent.

Stuffing is carried out in a conventional manner using solid synthetic materials.

Further treatment of the semi-finished goods is effected according to the commonly known technique.

In cases where a delimed and pickled pelt is to be treated the pickling process must be performed in the presence of ammonium sulfate until the belt becomes completely pickled with sulfuric acid, acid consumption equalling from 1.3 to 2 per cent, ammonium sulfate, from 60 to 70 g per lit at a water-to-pelt ratio equal to 1, a temperature ranging from 18° to 20°C and the pH value of the semi-finished goods being not in excess of 2.2 at the end of the pickling procedure. Then single-stage tanning with the titanium tanning agent is carried out in a waste pickling solution with the water-to-pelt ratio being preliminarily increased up to 1.5. Consumption of the tanning agent is from 7 to 10 per cent, no ammonium sulfate being added. Further on the tanning process proceeds in keeping with the aforedescribed technique effective with reference to the second stage of the tanning process, and the subsequent processes as specified above.

When employing delimed, pickled and chromed pelt, the entire process, chroming inclusive, is effected by the conventional technique whereas tanning and the subsequent procedures are performed in keeping with the technique described with reference to delimed and pickled pelt with the sole exception that a freshly composed tanning liquor is employed for the tanning process.

When using a combination of titanium and zirconium tanning agents all the processes described above, chroming inclusive, are performed by the conventional techniques. Then tanning is carried out using ammonium sulfate in a water-to-pelt ratio equalling 1.5 and a temperature of from 20° to 25°C and by resorting to a mixture of dry tannins, viz., sodium sulfate and zirconate with titanium tanning agent. Consumption of ammonium sulfate amounts to 5–8 per cent of the pelt weight, that of sodium sulfate and zirconate, from 3 to 5 per cent and the titanium agent, from 3 to 5 per cent,
no soda ash being needed to add at the beginning of the tanning process.

Further on the tanning process and all the operations that follow it are performed in a similar manner to those described above.

The tanning agent obtainable by the method disclosed in the present invention is likewise applicable in tanning fur skins, the tanning technique being carried out as follows.

Fur skins soaked by the conventional method are fleshed and tanned with the use of the titanium agent taken in an amount of from 0.3 to 1 per cent of the weight of soaked skins and in the presence of ammonium sulfate taken in a quantity of 40 g per lit. The tanning process proceeds at water-to-pelt ratio of from 2 to 6 and a temperature of from 18° to 20°C during a period of from 2 to 8 hours. When the tanning process comes to an end, sodium sulfite and urotropin are added each taken in an amount of 1 per cent of the weight of soaked skins. Tanning should result in a complete penetration of the skins by the tanning agent and in a final shrinkage point of the semi-finished goods falling within 68° to 75°C. To heighten the basicity up to 60 per cent some soda ash must be added at the beginning of the tanning process. The tanning procedure over, the semi-finished goods are washed, stuffed with a higher fat-content stuff and then dyed, curried and dressed by the conventional method.

In cases where delimed fur skins are to be treated they are tanned as follows. Semi-finished goods are treated with a solution of dichromic acid taken in an amount of 1 per cent of the weight of soaked skins, at a temperature of from 18° to 20°C, a water-to-pelt ratio of 1.3 during a period of 0.5 to 1 hour, whereupon the titanium agent is added in an amount of 2 to 4 per cent and tanning proceeds during 1 hour. Next sodium sulfite is introduced in an amount of from 1 to 2 per cent and tanning lasts until a complete penetration of the skins by the titanium agent and a reduction of hexavalent chromium to the trivalent form. This done, the skins are washed, neutralized with urotropin and sodium sulfite taken in an amount of from 1 to 2 per cent each until the pH value of the semi-finished goods reaches 3.5 to 4, and stuffed at a higher fat consumption rate. All the subsequent treatment procedures are carried out using conventional techniques.

What we claim is:

1. A method of tanning delimed pelts using ammonium titanyl double sulfate monohydrate as tanning agent wherein said tanning agent in dry form is introduced into the tanning bath so that at the initial stage of the tanning process the agent is introduced in an amount of from 2 to 5 per cent of the pelt weight as referred to the percentage of $TiO_2$, while at the final stage of the tanning process, upon draining the tanning liquor and penetrating of the pelt by the tanning agent, it is introduced in an amount of from 5 to 8 per cent of the pelt weight as referred to the percentage of $TiO_2$ and wherein said tanning agent is prepared by dissolving titanium-containing material in sulfuric acid to form a solution containing titanium ions; adding ammonium sulfate to said solution in an amount of 180 to 300 g/l and adjusting the content of $H_2SO_4$ to 300 g/l while keeping the aggregate concentration of ammonium sulfate and $H_2SO_4$ to from 520 to 620 g/l in order to precipitate substantially all the titanium from said solution as ammonium titanyl double sulfate monohydrate at a temperature of 12° to 30°C.; removing said precipitate, washing said precipitate with a solution containing 300 to 450 g/l $H_2SO_4$ and 180 to 300 g/l of $(NH_4)_2SO_4$; and then washing the precipitate with a solution containing 300 to 400 g/l of ammonium sulfate.

2. A method of tanning delimed and pickled, or delimed pickled and chromed pelt using ammonium titanyl double sulfate monohydrate as the tanning agent, wherein said tanning agent is taken in an amount of from 5 to 10 per cent of the pelt weight as referred to the percentage of $TiO_2$ and wherein said tanning agent is prepared by dissolving titanium-containing material in sulfuric acid to form a solution containing titanium ions; adding ammonium sulfate to said solution in an amount of 180 to 300 g/l and adjusting the content of $H_2SO_4$ to 300 to 450 g/l while keeping the aggregate concentration of ammonium sulfate and $H_2SO_4$ to from 520 to 620 g/l in order to precipitate substantially all the titanium from said solution as ammonium titanyl double sulfate monohydrate at a temperature of 12° to 30°C.; removing said precipitate; washing said precipitate with a solution containing 300 to 450 g/l $H_2SO_4$ and 180 to 300 g/l of $(NH_4)_2SO_4$; and then washing the precipitate with a solution containing 300 to 400 g/l of ammonium sulfate.

3. A method of tanning as claimed in claim 2, wherein said tanning agent is employed in combination with zirconium tanning agent.

4. A method of tanning as claimed in claim 1, wherein, soda ash is introduced together with the titanium agent.

5. A method of tanning as claimed in claim 1, wherein a mixture of sulfite with hexamethylenetetramine is added to the pelt after the final phase of tanning is complete.

6. A method of tanning fur skins using ammonium titanyl double sulfate monohydrate as the tanning agent, wherein said agent is introduced just after the skin soaking process in an amount of from 0.3 to 1 per cent of the weight of soaked skins and wherein said tanning agent is prepared by dissolving titanium-containing material in sulfuric acid to form a solution containing titanium ions; adding ammonium sulfate to said solution in an amount of 180 to 300 g/l and adjusting the content of $H_2SO_4$ to 300 to 450 g/l while keeping the aggregate concentration of ammonium sulfate and $H_2SO_4$ to from 520 to 620 g/l in order to precipitate substantially all the titanium from said solution as ammonium titanyl double sulfate monohydrate at a temperature of 12° to 30°C., removing said precipitate; washing said precipitate with a solution containing 300 to 450 g/l $H_2SO_4$ and 180 to 300 g/l of $(NH_4)_2SO_4$; and then washing the precipitate with a solution containing 300 to 400 g/l of ammonium sulfate.

7. A method of tanning delimed skins wherein delimed skins are treated with dichromic acid and then with ammonium titanyl double sulfate monohydrate as the tanning agent in an amount of from 2 to 4 per cent by weight of said skins with a subsequent reduction of chromium to the trivalent form and wherein said tanning agent is prepared by dissolving titanium-containing material in sulfuric acid to form a solution containing titanium ions; adding ammonium sulfate to said solution in an amount of 180 to 300 g/l and adjusting the content of $H_2SO_4$ to 300 to 450 g/l while keeping the aggregate concentration of ammonium sulfate and $H_2SO_4$ to from 520 to 620 g/l in order to precipitate substantially all the titanium from said solution as ammonium titanyl double sulfate monohydrate at a temperature of 12° to 30°C.; removing said precipitate; washing said precipitate with a solution containing 300 to 450 g/l $H_2SO_4$ and 180 to 300 g/l of $(NH_4)_2SO_4$; and then washing the precipitate with a solution containing 300 to 400 g/l of ammonium sulfate.

* * * * *